A. B. BUELL.
Nut-Locks.

No. 147,305. Patented Feb. 10, 1874.

Witnesses:
H. L. Perrine
Wm E. Chaffee

Inventor:
Abel B. Buell
Per C. M. Parks
atty.

UNITED STATES PATENT OFFICE.

ABEL B. BUELL, OF UTICA, NEW YORK.

IMPROVEMENT IN NUT-LOCKS.

Specification forming part of Letters Patent No. 147,305, dated February 10, 1874; application filed December 26, 1873.

*To all whom it may concern:*

Be it known that I, ABEL B. BUELL, of Utica, Oneida county, New York, have invented an Improvement in Nut-Locking Washers; and I do hereby declare the following to be a full and correct description of the same, reference being had to the accompanying drawings, in which—

Figure 1:
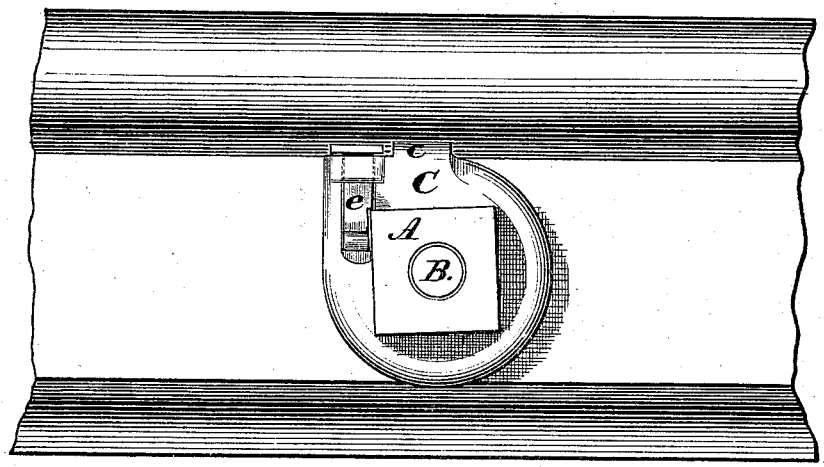
Figure 2:
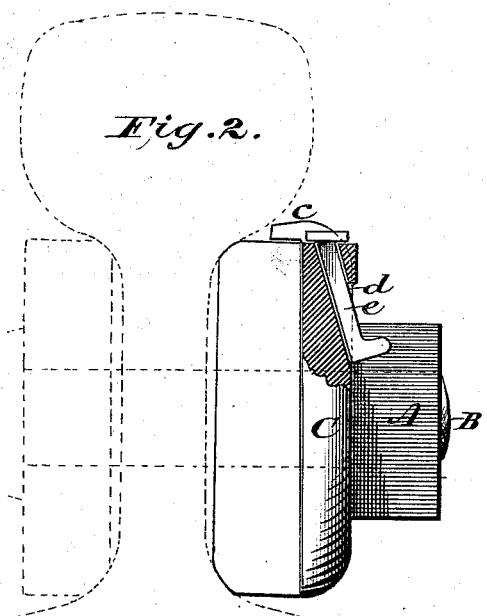
Figure 3:
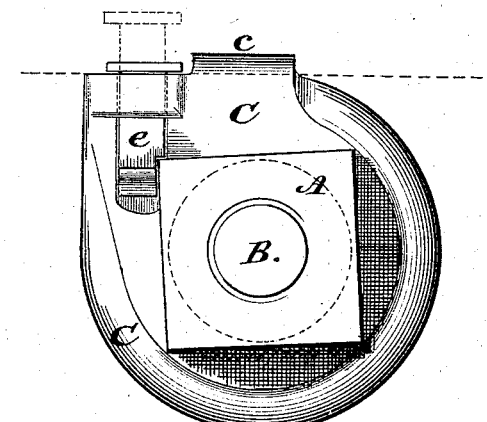

Figure 1 represents a side view of a section of a railroad-rail with the fish-bar bolted and the nut locked with my nut-locking washer. Fig. 2 represents an end view of my washer in full size, and Fig. 3 a front view of the same on the same scale.

My invention consists in applying to a washer under the nut of a bolt a loose bolt, by which the nut may be locked in its place.

In the drawings, A represents the nut of a bolt, and B the bolt. Underneath the nut A is the washer C, which, when applied to the fish-bar of a railroad-rail, has a lip, $c$, upon its upper edge, extending over the top of the fish-bar, by which the washer is kept in place. Upon one side of the washer C is a mortise, $d$, cast diagonally through from the upper edge to outer face, as seen in Fig. 2. Into this mortise is cast a bolt, $e$, with a head upon its upper end and a side projection upon its lower end, which are for the purpose of preventing the removal of the bolt from the mortise either up or down. This bolt is cast loose into the mortise in the usual manner of casting loose parts in metals. Upon the lower side of the bolt $e$, and next to the nut A, is a notch, made to fit the corner of the nut, and into which it rests.

The operation of my invention is as follows: The bolt having been put through the two fish-bars and the shank of a railroad-rail, the washer is put upon it, and the nut screwed upon its end. The lip $c$, extending over the fish-bar, keeps the washer in its proper position, so that the bolt, by its gravity, will rest upon its head into the mortise. As the nut is revolved, its corners strike the lower end of the bolt $e$, and raise it in the mortise until the corner of the nut passes by, when it falls back and resumes its original position. The next corner of the nut then strikes it, and the same operation is repeated, and so on until the nut is screwed home. The last corner which passed the bolt is then brought back into the notch into the lower corner of the bolt, and the nut is locked, and cannot be unscrewed unless some foreign power raises the bolt and allows the nut to pass backward.

Having thus described my invention, what I claim, and desire to secure by Letters Patent, is—

A cast-metal nut-locking washer, provided with a loose bolt, $e$, inseparably connected by being headed at both ends, in combination with a bolt and nut, substantially as and for the purpose set forth.

The above specification of my said invention signed and witnessed at Utica, New York, this 23d day of December, A. D. 1873.

ABEL B. BUELL.

Witnesses:
GEO. LERBRAUGH,
ABEL B. HALLECK.